Jan. 19, 1932.  E. R. MUNN  1,841,841
ROTARY ENGINE
Filed April 4, 1930  4 Sheets-Sheet 1
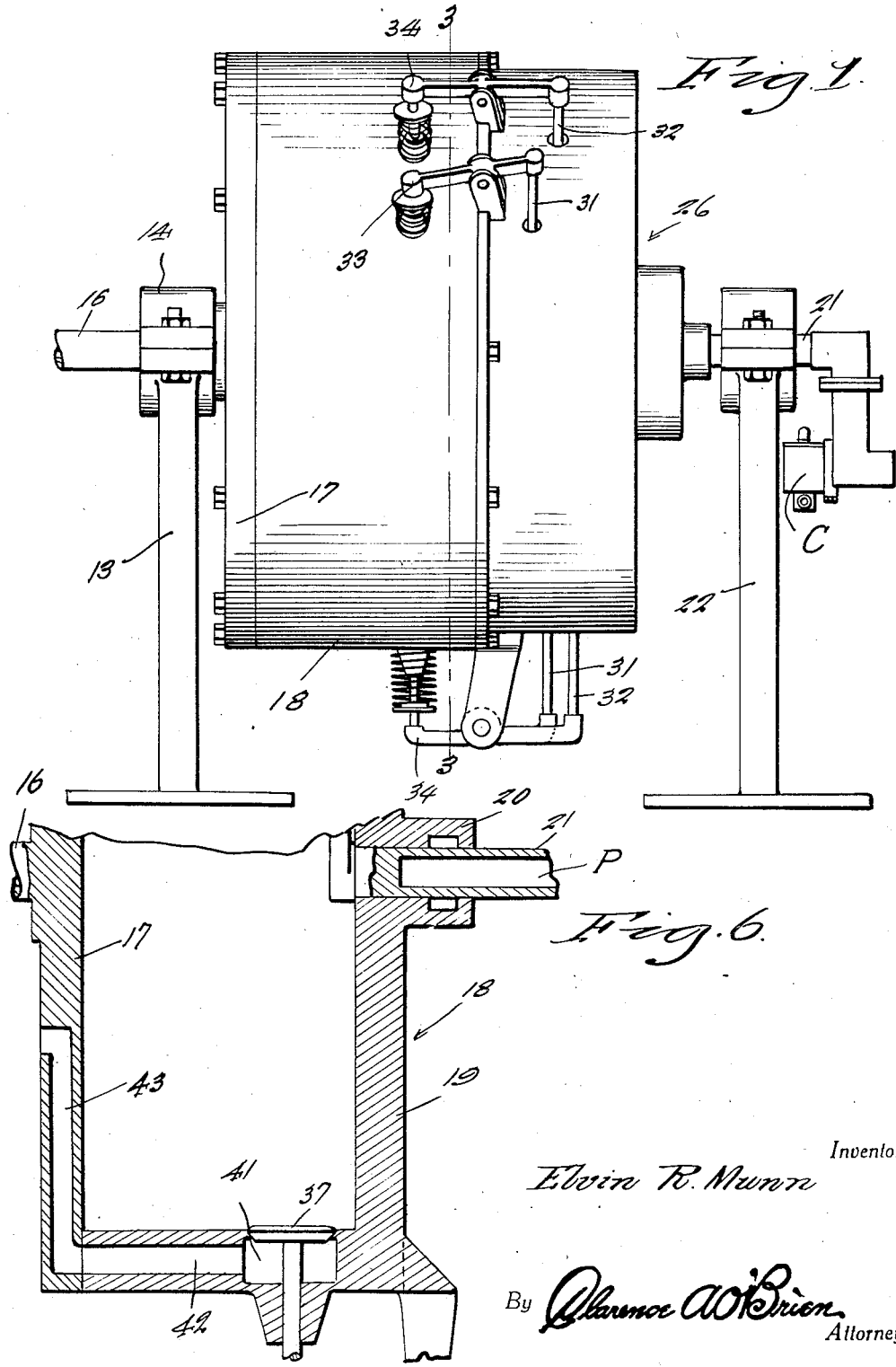
Inventor
Elvin R. Munn
By Clarence A. O'Brien
Attorney

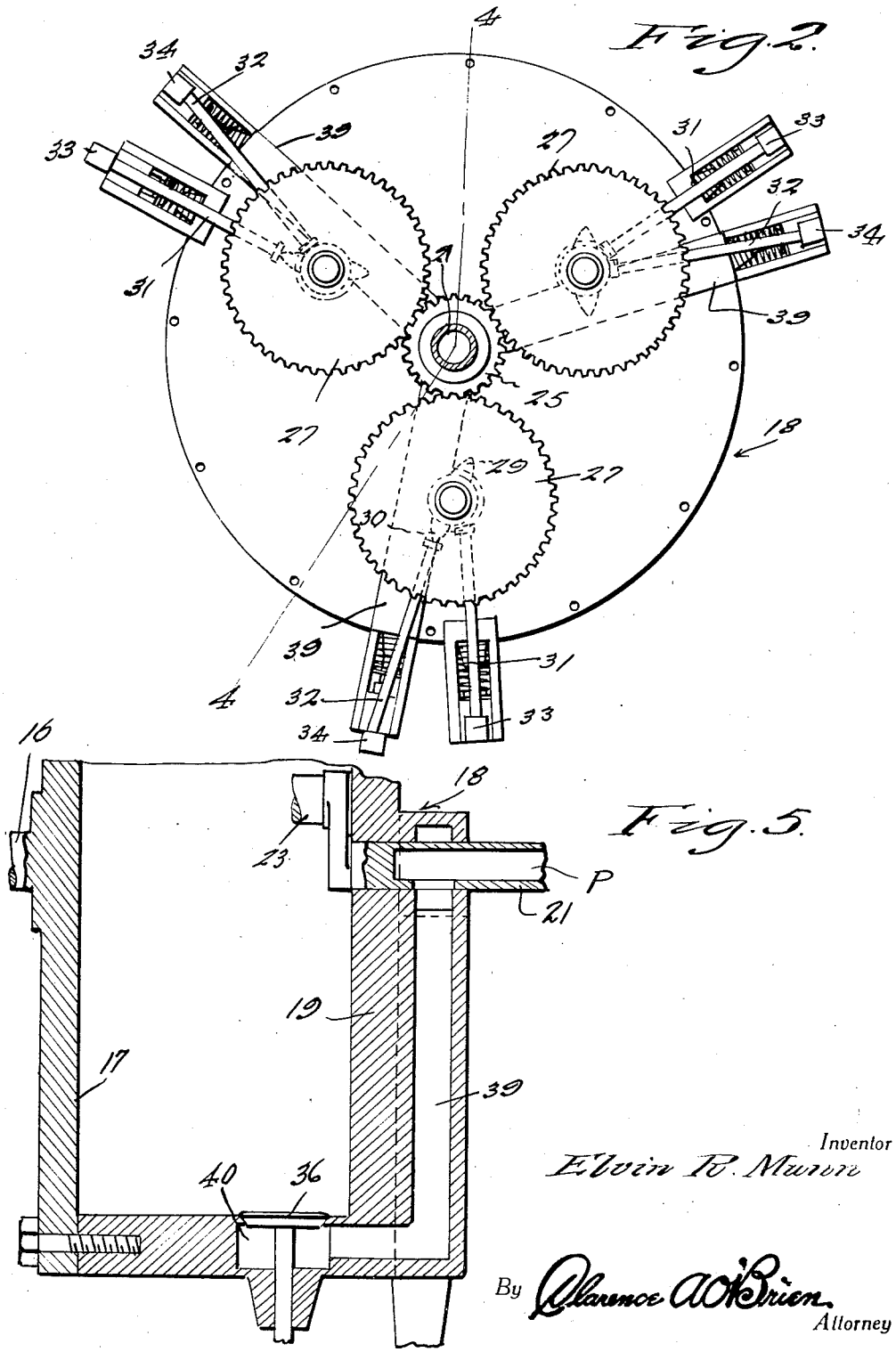

Jan. 19, 1932.  E. R. MUNN  1,841,841
ROTARY ENGINE
Filed April 4, 1930  4 Sheets-Sheet 3
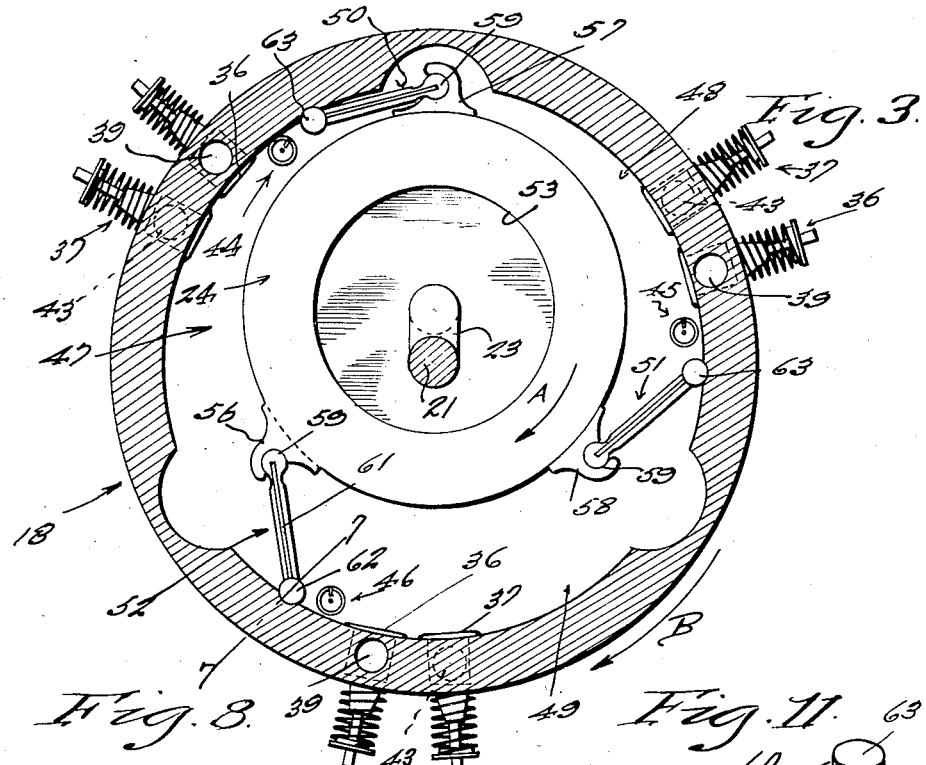
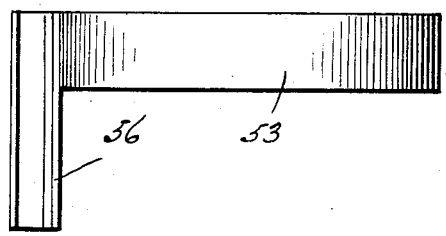
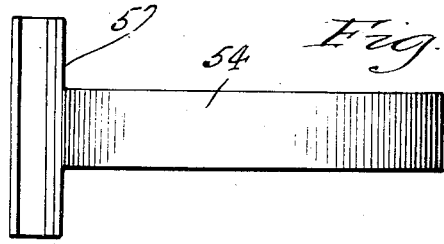
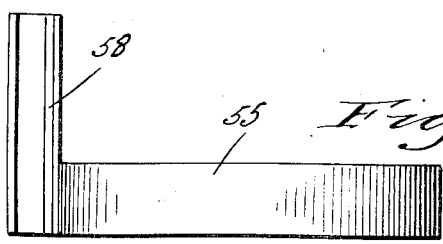
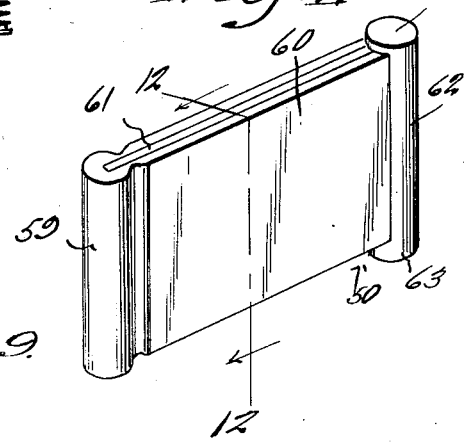
Inventor
Elvin R. Munn
By Clarence A. O'Brien
Attorney Jan. 19, 1932.  E. R. MUNN  1,841,841

ROTARY ENGINE

Filed April 4, 1930  4 Sheets-Sheet 4

Inventor
Elvin R. Munn

By Clarence A. O'Brien
Attorney

Patented Jan. 19, 1932

1,841,841

UNITED STATES PATENT OFFICE

ELVIN R. MUNN, OF HUMANSVILLE, MISSOURI, ASSIGNOR OF ONE-EIGHTH TO ORA CACY, OF DUNNEGAN, MISSOURI

ROTARY ENGINE

Application filed April 4, 1930. Serial No. 441,602.

This invention relates to a power developing and supply device which is herein entitled for sake of convenience, a rotary engine. Stated more broadly, however, the invention has reference to a structure of this general classification which is susceptible of expeditious operation by utilizing such mediums as steam, compressed air, gas, or other suitable elastic motive fluid.

In the embodiment of the invention described and illustrated in this application, the structure is in the form of a rotary internal combustion engine.

More specifically stated, the primary novelty of the invention is predicated upon an engine of this general classification which is characterized by a bodily rotatable casing functioning as a cylinder and housing for an especially designed rotor, the rotor being mounted eccentrically in the casing. Between the rotor and casing are swingable abutments or motive force developing vanes defining individual combustion chambers and operatively connecting the rotor and casing together so that they rotate as a unit.

In carrying the invention into practice, I have perfected a structure which constitutes a novel contribution to the prior art, the arrangement being such as to afford uniform rotative movement of the rotor without stoppage so as to insure the development of a continuous torque.

A further purpose and object is to provide for complete expansion of the motive fluid, to insure effective and dependable forcible application to the swingable vanes, to guard against leakage, and to provide for complete scavenging of the utilized gases.

Considered from a structural standpoint, one of the outstanding improvements of the invention is the novel assembly of the eccentric rotor within the casing, said rotor being of a multiple disk form to provide for appropriate structural mounting of the impact receiving vanes and to compensate for the necessary differential feed action between the relative disc and the casing, whereby to insure the aforesaid uniform and continuous rotative movement and powerful development of the power to be utilized at some external point.

Other constructional features, advantages, and results will become more readily apparent from the following description and drawings:

In the drawings:

Figure 1 is an elevational view of a rotary internal combustion engine constructed in accordance with the present invention.

Figure 2 is a side view thereof with the protective shield gear housing removed to expose the valve actuation gearing.

Figure 3 is a central vertical section taken approximately on the plane of the line 3—3 of Figure 1.

Figure 5 is an exaggerated fragmentary elevational view showing the intake construction.

Figure 6 is a view similar to Figure 5 showing the opposite side of the structure and detailing the exhaust ducts.

Figures 8, 9 and 10 are detail elevational views of the companion disks which serve to make up the laminated or multiple disk assembly constituting the eccentric rotor.

Figure 11 is a perspective view of one of the especially designed swingable vanes.

Figure 4:
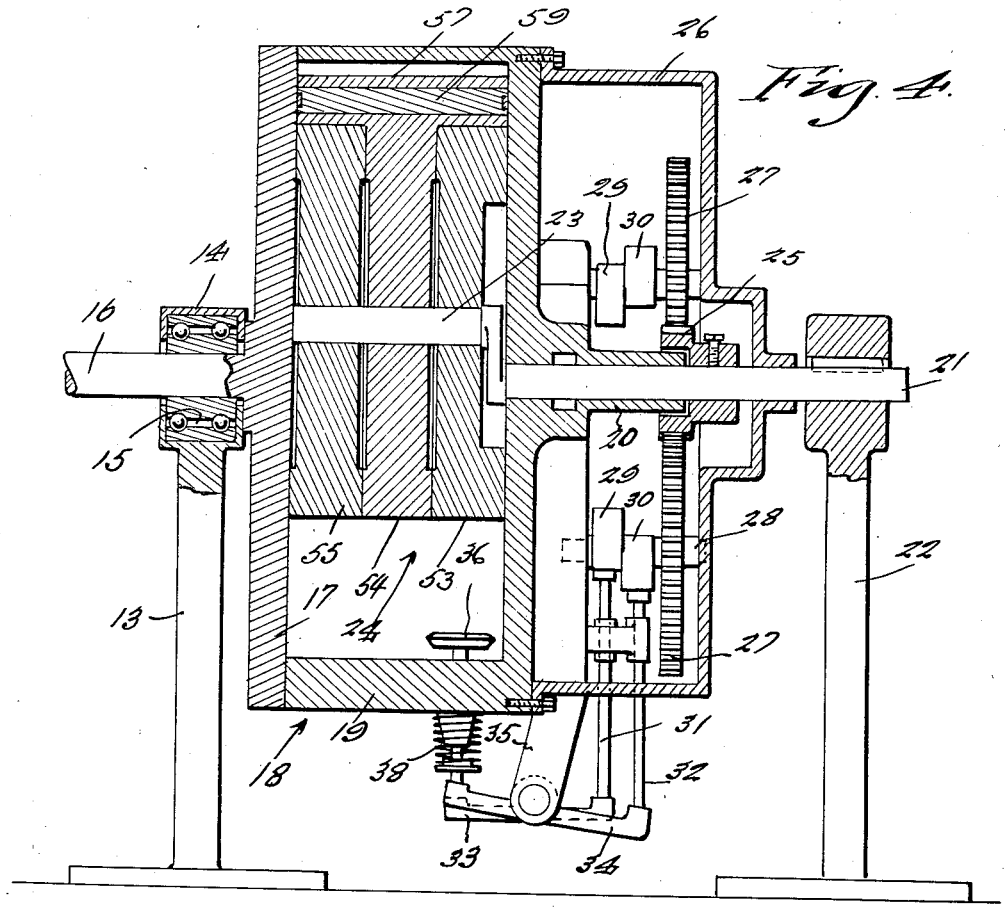
Figure 4 is an irregular sectional view taken approximately on the plane of the line 4—4 of Figure 2.

Attention is first invited to Figure 4. Here the numeral 13 designates a standard having a head construction 14 at the upper end including an anti-friction roller bearing assembly 15. This serves to accommodate the power take-off shaft 16 which is here shown as formed integral with the headplate 17 of the rotary casing 18.

The body portion of the casing is designated by the numeral 19 and this includes a hub structure 20 rotatably surrounding the fixed portion 21 of the stationary crank shaft. This shaft is mounted on the upper end of the opposite standard 22. The crank portion of the shaft is denoted by the numeral 23 and this is confined within the interior of the casing in a position to eccentrically support the rotor 24.

The rotor fits snugly in the casing and is movable in the direction of the arrow A as seen in Figure 3. The casing turns in the same direction of the arrow B. Thus in a position represented in Figure 3, the rotor takes a wabbling action approaching the peripheral wall of the casing in a predetermined stage in the operation.

The numeral 25 represents a stationary pinion mounted on the shaft 21 and confined in the shell-like gear housing 26. The gear housing is carried by the rotary casing. A series of three gears is provided for actuating the valve mechanism. Inasmuch as the valve mechanism is the same in each instance, a description of one will suffice for all.

Thus, each gear is designated by the numeral 27 and is mounted on the shaft 28 in a position to be in constant mesh with the teeth of the pinion 25. The shaft 28 is provided with cams 29 and 30 co-operating with the pushrod 31 and 32 respectively which in turn actuates the rockers 33 and 34 respectively. These rockers are carried by suitable supporting brackets 35.

The rockers control the valves 36 and 37 respectively, the valves 36 being intake valves, and the valves 37 being exhaust valves. The valve springs are simply designated by the numeral 38.

Continuing with the explanation of the intake and exhaust control, it will be observed that the numeral 39 in Figure 5, represents the inlet duct communicating, at one end, with the port 40 with which the intake valve 36 co-operates. At its other end, the duct 39 communicates with the passage P in the shaft 21 for receiving fuel therethrough from the carbureter C. As seen in Figure 6, the exhaust port 41 is located for co-operation with the exhaust valve 37 and registers with the communicating ducts 42 and 43 respectively, thus discharging the exhaust gasses into the atmosphere.

It will be observed that I provide a series of three pairs of valves in order to form a four-cycle engine, and the valve mechanisms are located at circumferentially spaced equidistant points for proper timing. In connection with this arrangement, let me call attention to the numerals 44, 45 and 46, which designate the complemental spark plugs also located at equi-distant points.

Moreover, as seen in Figure 3, the numerals 47, 48 and 49 respectively designate the individual or distinguishable combustion chambers each having its respective valve mechanism and spark plug.

The chambers 47, 48 and 49 are more distinctly completed and refined by the presence of the swingable abutments or vanes 50, 51 and 52 respectively, these abutments being associated in proper co-operative relation with the simultaneously rotatable rotor 24 and its casing 18.

So far as the detailed description has gone, I have merely described a convenient and practical ignition and valve arrangement susceptible of developing a practical four-cycle rotary engine of the internal combustion engine type, the specific construction of these parts being more or less immaterial as compared to the principal novelty to be hereinafter described.

I am aware of the fact that the disposition of a rotor eccentrically within a fluid tight casing and means for rotating the rotor and casing together as a unit is not broadly new. It follows therefore that the principal novelty is predicated upon the specific internal structure within the casing, namely, the vanes, their mountings, and the particular construction of the multiple part rotor.

As seen in Figure 4, the rotor is here shown as composed of three companion discs arranged in superimposed arrangement thus making a laminated rotor. These discs are movable at relatively varying speeds and are therefore of a differential type. For sake of clearness, these elements are separately denoted.

For example, as seen in Figures 8, 9 and 10, the top disc is distinguished by the numeral 53, the central one by the numeral 54, and the next one by the numeral 55. The disc 53 carries a peripheral joint-forming knuckle 56 which is located slightly different with respect to the complemental knuckles 57 and 58 respectively.

These knuckles as thus disposed serve to provide the desired separable fluid-tight connections between the inner ends of the vanes and the discs constituting the rotor 24. Each vane however is the same in construction and a description of one will suffice for all.

For example, as seen in Figure 11, the vane 50 is provided at its inner end with a rib 59 forming a hinge pintle which is swingably connected with the knuckle 57. The blade portion 60 is provided in its top and bottom edges with grooves to accommodate the spring pressed packing strip 61 which have wiping contact with the inner walls of the casing to provide the requisite fluid-tight connection.

Figures 7, 12:
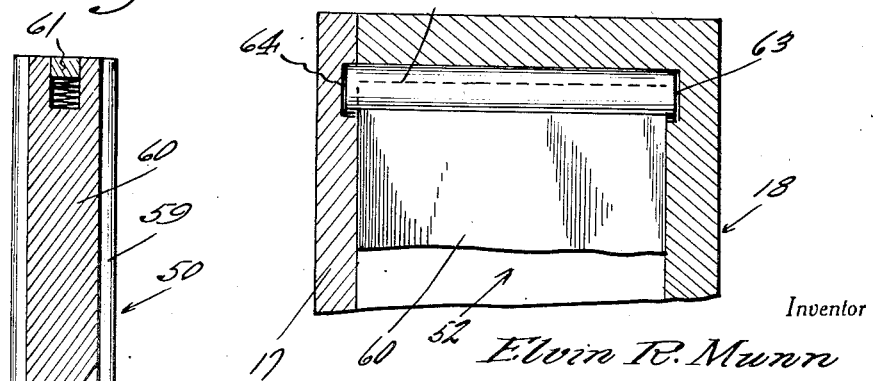
Figure 7 is an enlarged view showing one end of the swingable vane mounting, the section being on the line 7—7 of Figure 3.
Figure 12 is a cross section on the line 12—12 of Figure 11.

The rib 62 on the opposite end of the blade is of cylindrical formation and constitutes a fulcrum and is rockably mounted in a correspondingly shaped groove formed in the rim or peripheral portion of the casing as represented in Figure 3. Thus, both ends of the vane have fluid tight connection with the respective casing and rotor. If desired, the end portion 63 of the fulcrum 62 may be projected slightly for reception in the depressions 64 in the bases of the casing as represented in Figure 7.

In this way, the vane has positive and direct physical connection at one end with the casing, and confined hinged connection at the opposite end with the rotor. It is obvious however, that one vane is connected with the proper disc in the rotor assembly so as to permit the several discs to have the necessary or requisite differential speed action during the rotation of the rotor and casing as a unit.

In this way, the proper master operating connection is provided between the crank shaft, the rotor, and the casing. Incidently, the rotor is mounted for rotation around the crank 23 and the various discs thereof have the desired relative speed rotation so as to permit the necessary individual actuation.

Then too, the rotor as a unit is movable relatively with respect to the casing. The casing is mounted for rotation on the stationary crank shaft 21. With this arrangement the vanes span the space between the peripheral portion of the rotor and the internal peripheral portion of the casing to provide individual fluid tight explosion chambers as before stated, whereby to permit the explosions to be forcibly applied to insure continuous rotation of the engine.

It is thought unnecessary to describe the successive position and cycles of explosion, intake and exhaust, since the basic principle of this rotary engine is similar to that of numerous rotary engines embodying an eccentric rotor and a casing bodily rotatable at relatively different speeds.

The point to be emphasized is the multiple or sectional construction of the rotor, the individual fluid-tight joint connections between the inner ends of the vanes and the positive rockably fulcrum action at the outer end of the vanes resting against the casing wall or rim. This arrangement affords a practical and efficient structure for properly utilizing the force of the motive fluid and provides the necessary flexible operating connection between the rotor and its casing.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice if desired.

I claim:

1. A structure of the character described comprising, in combination, a rotary casing, a stationary shaft disposed eccentrically in the casing, a rotor mounted for rotation on the shaft and comprising a plurality of independently rotatable disks journaled concentrically on the shaft, and a plurality of spaced swingable vanes pivotally connected, at one end, to the casing at the inner periphery thereof, each of the vanes having its other end pivotally connected with the periphery of one of the disks for providing a separate connection with the casing for each disk.

2. A structure of the character described comprising, in combination, a circular, rotary casing, a stationary shaft disposed eccentrically in the casing, a rotor of less diameter than the cylinder, mounted for rotation on the shaft and comprising a plurality of side abutting independently rotatable disks journaled concentrically on the shaft, and a plurality of equidistantly spaced swingable vanes pivotally connected, at one end, to the casing at the inner periphery thereof in a manner to provide a substantially leak-proof joint between said inner periphery and said one end of the vanes, each of the vanes having its other end pivotally connected with one of the disks in a manner to provide a substantially leak-proof joint between the vanes and the periphery of the rotor and for providing a separate connection with the casing for each disk, the side edges of the vanes having wiping contact with the adjacent sides of the casing in a manner to provide a substantially leak-proof joint therebetween, said vanes dividing the space between the rotor and the casing into a plurality of chambers.

3. A structure of the character described comprising, in combination, a rotary cylinder, a stationary shaft disposed eccentrically in the casing, a rotor, of less diameter than the casing, mounted for rotation on the shaft and comprising a plurality of independently rotatable disks journaled concentrically on the shaft, and means for connecting each disk to the casing including a hinge shoe mounted on the periphery of each disk, said hinge shoes each being substantially coextensive with the rotor and spaced circumferentially thereon, a vane swingably connected, at one end, with each hinge shoe and at its other end with the casing at the inner periphery thereof, the longitudinal sides of the vanes having wiping contact with the adjacent sides of the casing, the vanes constituting means for dividing the space between the rotor into a plurality of expansible and contractible fluid receiving chambers.

In testimony whereof I affix my signature.

ELVIN R. MUNN.